United States Patent [19]

Epars

[11] Patent Number: 4,740,733
[45] Date of Patent: Apr. 26, 1988

[54] AUTOSYNCHRONOUS MOTOR COMPRISING A DEVICE FOR DETERMINING THE POSITION OF THE ROTOR RELATIVE TO THE STATOR, AND METHOD OF STARTING SUCH MOTOR

[75] Inventor: Michel Epars, Montesson, France

[73] Assignee: Auxilec, Colombes, France

[21] Appl. No.: 830,829

[22] Filed: Feb. 19, 1986

[30] Foreign Application Priority Data

Feb. 28, 1985 [FR] France ............... 85 02967

[51] Int. Cl.⁴ ........................... H02K 29/00
[52] U.S. Cl. ...................... 318/254; 310/41; 318/138; 318/136
[58] Field of Search ............ 318/136, 254, 138; 310/84, 41

[56] References Cited

U.S. PATENT DOCUMENTS

| | | | |
|---|---|---|---|
| 1,681,649 | 8/1928 | Sibley | 318/136 |
| 2,027,944 | 1/1936 | Whitehead | 318/136 |
| 3,386,019 | 5/1968 | Hill | 318/254 |
| 3,559,014 | 1/1971 | Rakes | 318/254 |
| 3,609,492 | 9/1971 | Rakes | 318/254 |
| 3,832,613 | 8/1974 | Bernstein et al. | 318/269 |
| 4,532,460 | 7/1985 | Gale | 318/448 |

Primary Examiner—David Smith, Jr.
Attorney, Agent, or Firm—Pollock, VandeSande & Priddy

[57] ABSTRACT

An autosynchronous motor comprises a control and power circuit for the windings of a stator generating a rotating field the angular direction of which is a function of the magnetizing direction of the permanent magnet of the rotor, and to a positioning device producing a signal representing the angular position of the rotor relative to the stator windings. This positioning device emits one pulse per rotation; it comprises a moveable member integral with the rotor and a steady or fixed member integral with the stator.

The stator member of the positioning device and the stator comprise complementary means so that this stator member can, by manual operation, be rotated around the axis of the motor. Marking references are provided for predetermined angular positions of the stator member. These complementary means are, for example, on the stator constituted by a ball repelled by a spring and on the stator member by a number of notches equal to the number of pairs of the rotor.

1 Claim, 2 Drawing Sheets

AUTOSYNCHRONOUS MOTOR COMPRISING A DEVICE FOR DETERMINING THE POSITION OF THE ROTOR RELATIVE TO THE STATOR, AND METHOD OF STARTING SUCH MOTOR

FIELD OF THE INVENTION

The present invention concerns an autosynchronous machine comprising a device for determining the position of the rotor relative to the stator.

BACKGROUND

A synchronous motor is constituted by a rotor provided with permanent magnets and a wound stator supplied with A.C. power so as to generate a rotating field that drives the rotor. The speed of the rotor is equal to that of the rotating field. In a synchronous generator, the rotation of the rotor provided with permanent magnets induces the alternating currents within the windings of the stator.

The stator windings of an autosynchronous motor are supplied by a D.C. power source chopped by controlled switches, such as transistors or thyristors, the control being such that the rotating field has an optimal position with respect to that of the rotor in order to obtain a maximum-value motor torque. In order to render the phase of the stator currents dependent upon the position of the rotor, use is made of a device for determining the position of the rotor relative to that of the stator. This position determining device generates one pulse per rotation of the rotor and the phase of the stator current is rendered dependent upon the instant that this pulse appears.

The position determining device comprises, for example, a code wheel driven by the rotor and a steady or fixed detector, for example a luminous source-light detector assembly, the whole being disposed in such a way that the pulse is generated once a pole of the magnet with which the rotor is provided has reached a determined position (with respect to the position of the detector) relative to the stator. This device comprises, in the present example, two other code wheels that both transmit $2^m$ pulses per rotation, m being the number of poles of the rotor. These two other code wheels detect the direction of rotation and the pulses produced are used in order to generate the order signals for the controlled switches, i.e. for determining the phase of the currents supplying the stator.

Each position determining device has a fixed or first part integral with the stator and a moveable or second part integral with the rotor. The first part must have a position that is determined with respect to the windings of the stator and the second part must have a position that is determined with respect to the poles of the rotor. If the position of the first part of the position determining device is modified with respect to the stator, the proper operation of the motor can be impaired as the rotating field may not have the optimal direction relative to the poles of the rotor.

At starting, since the position of the rotor is unknown, the stator is supplied by an independent generator in order to work step by step. Only after the pulse issued from the first code wheel has been transmitted, can the current phase in the stator windings can be rendered dependent upon the position of the rotor in order to produce the maximum torque.

It will be observed that for certain applications it is objectionable that upon starting, the motor rotates step by step, i.e with jerky movements. Furthermore, for reasons of space, it is often inconvenient that the part of the position determining device secured to the stator has a fixed position with respect to said stator.

The present invention overcomes these drawbacks.

SUMMARY OF THE INVENTION

The present invention is characterized in that the first part (or member) of the position determining device that in the prior art was fixed with respect to the stator now comprises means for allowing rotation of the first part relative to the stator around the axis of the motor, so that the angular position may be manually modified. The first part of the position determining device and the stator have complementary markings corresponding to optimal positions of the position determining device relative to the windings of the stator. The maximum number of these angular positions is preferably equal to the number of pairs of poles of the rotor.

In a preferred embodiment, complementary means are provided in the said stator part of the position determining device and in the frame of the stator which means cooperate so that the resistant torque opposed to the rotation of the said stator part is greater once this first part is in a predetermined angular position than the torque is when the first part is in an intermediate position. These complementary means, for example, have n hollows, n being the number of pairs of poles of the rotor, at the periphery of the stator part of the position determining device and a ball repelled by a spring in the frame of the stator.

BRIEF DESCRIPTION OF THE DRAWINGS

Other features, objects and advantages of the present invention will become apparent from reading the following description of certain embodiments, given with reference to the appended drawings in which.

DETAILED DESCRIPTION OF THE DRAWINGS

Figure 1:
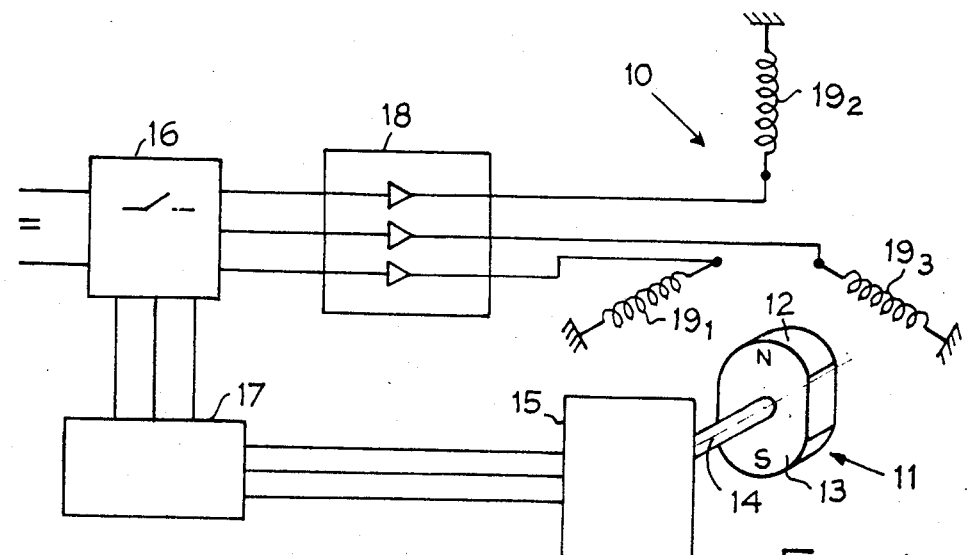
FIG. 1 is a block diagram of an autosynchronous motor.

The principle of an autosynchronous motor, which is already known, will not be described with reference to FIG. 1.

This type of motor comprises a polyphase stator 10 and a rotor 11 having permanent magnet(s) that, for simplicity, have been represented by a single pair of poles, north (N) 12 and south (S) 13. A rotating portion (not represented in FIG. 1) of a code device 15 represents the device for determining the angular position of the rotor with respect to the stator. This rotating portion is integral with the shaft 14 of the rotor 11. This code device 15 also has a first part (not represented in detail) which is attached to the frame of the stator.

In the example, the rotating or second portion of the code device 15 comprises three wheels, one of which presents a single hole or notch and the other two of which present $2_m$ holes or notches, m being the number of poles of the rotor.

The stator element of the code device (the first part) includes three luminous source-light detector assemblies, one assembly for each code wheel; a light detector receives a beam from the corresponding source once a hole or a notch interrupts the occulsion of the first light beam by the interposition of the code wheel. The first code wheel, with the associated luminous source-detector assembly, produces one pulse per rotation; the instant that this pulse appears is a function of the angular position of the rotor relative to the stator. This pulse is used to ensure a correct phasing of the excitation currents of the stator relative to the position of the rotor so as to obtain the maximum torque. The two other code wheels allow production of pulses to control the static switches 16 to supply the stator windings at a frequency corresponding to the speed of rotation of the rotor 11. Therefore, the pulses produced by the three detectors are applied to the respective inputs of a control circuit 17 acting to control the conduction of the static switches 16. These static switches 16 are interposed between a D.C. power source and an amplifier stage 18. The amplifier stage 18 is directly connected to the stator windings comprising, in the simplified example represented in FIG. 1, three windings $19_1$, $19_2$, $19_3$.

Figure 2:
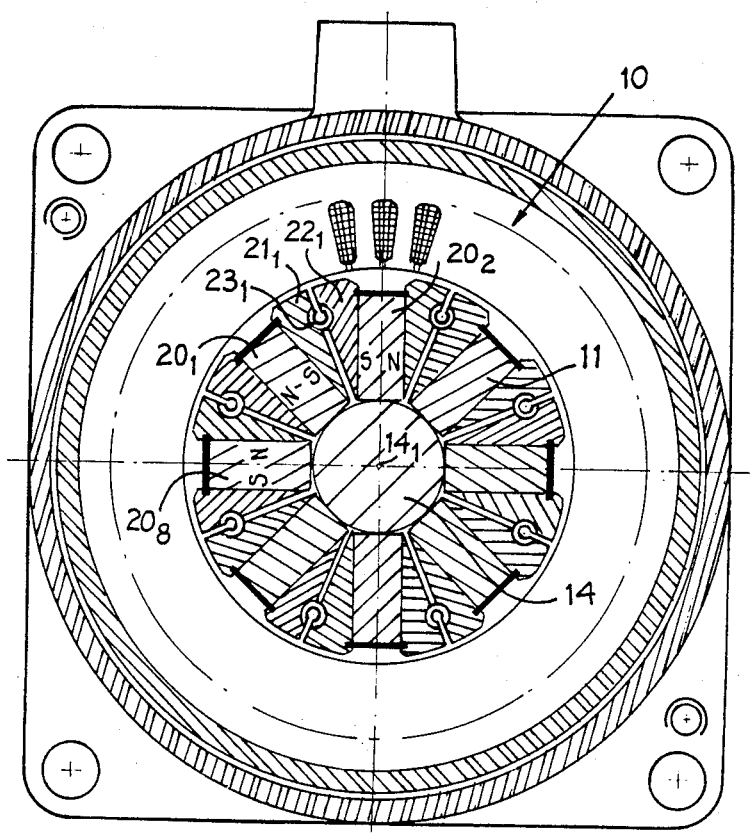
FIG. 2 is a cross-section perpendicular to the axis of an autosynchronous motor.

According to FIG. 2, the rotor 11 comprises four pairs of poles and including eight magnets $20_1$, $20_2$ ... $20_8$ disposed uniformly around the axis $14_1$ with an orthoradial magnetization, i.e. perpendicular to the radius. The magnetization of two successive permanent magnets are opposite in direction. At the periphery of the rotor, the magnetization is radial due to the pole pieces 21, 22 interposed between the successive magnets. In the example, the pole pieces $21_1$, $22_1$ are applied against the corresponding faces of the successive magnets $20_1$, $20_2$ by a split pin $23_1$ disposed within a cylindrical recess. The recess has an axis parallel to the axis $14_1$ and is formed by hollows provided in the adjacent faces of the pole pieces $21_1$, $22_1$. The two edges of the split pin $23_1$ apply, due to its spring properties, a flexible force against the two parts of its housing, thereby ensuring the application of the pole pieces against the corresponding magnets.

Figure 3:
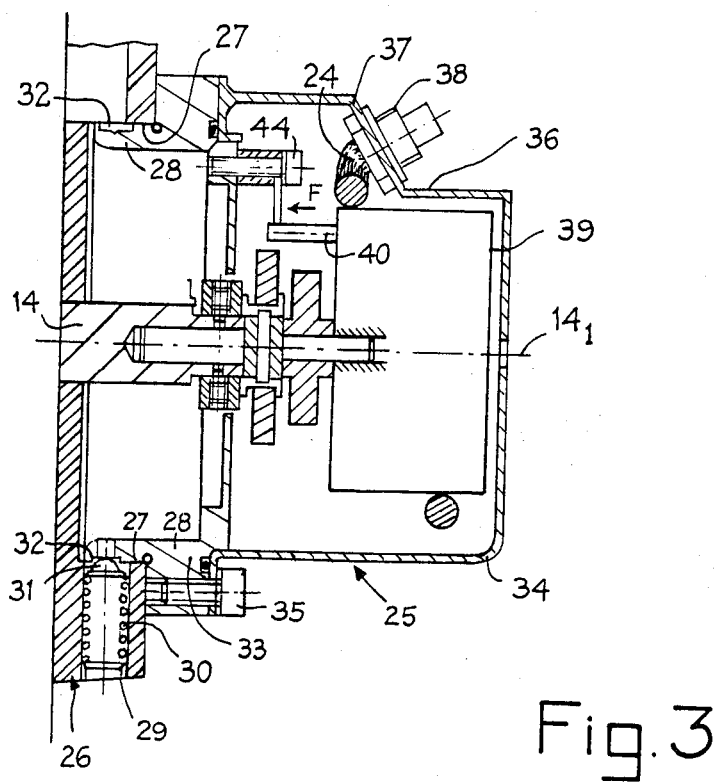
FIG. 3 is a cross-section, along the axis of the motor, of a device for determining the angular position of the rotor with respect to the stator, this device being secured to the frame of the stator, according to the invention.

Reference will now be made to FIG. 3 which represents the mounting, according to the invention, of the first part 25 (not driven by the rotor) of the code device 15 upon the frame 26 of the stator.

For simplicity of the drawings, the rotating part of the code device 15 which is driven by the shaft 14, has not been represented.

In order to receive a cylindrical end piece 28 of the housing intended for the first part 25, the end of the frame 26 of the stator presents a cylindrical cavity 27 having the same axis $14_1$ as the shaft 14.

The external diameter of the end piece 28 is slightly smaller than the internal diameter of the cavity 27 in order that this end piece 28 may rotate within the cavity.

The said end of the frame 26 of the stator presents a housing 29 adapted to receive a spring 30 that exerts a radial centripetal force against a ball 31 which protrudes slightly towards the inside of the cylindrical cavity 27. The protruding part of the ball 31 is housed within one of the openings 32 comprised within the end piece 28 on its periphery. The number of openings 32 is equal to the number (4) of pairs of poles of the rotor and these openings are uniformly arranged around the axis $14_1$.

Once the first part 25 is in a position whereby an opening 32 receives the ball 31, the currents supplying the windings 19 of the stator have such a phase that the motor torque has a maximal value.

The body 33 of the first part 25 that has an end piece 28, is extended, at the opposite end, by a cap 34 that is attached by screws 35. Inside the cap 34 is located the luminous source-detector assemblies (not represented) cooperating with the code wheels driven by the shaft 14 as well as the connections 24 of the said assemblies to the external power sources and to the control circuit 17. For this purpose, the cap 34 presents a flattened part 36 and an oblique wall 37 to which is fastened a connection 38 providing the electrical connections.

The code wheels as well as the said assemblies are arranged within the inside of a housing 39 under the cap 34.

Figure 4:
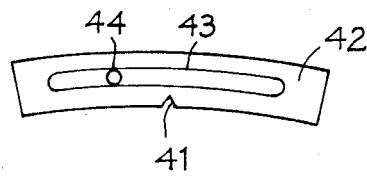
FIG. 4 is a view according to the arrow F of FIG. 3.

The housing 39 is attached to the body 33 by means that have not been fully represented. This housing 39 has an angular position that is adjustable relative to the body 33. For this purpose a finger 40 protrudes from the housing in the direction of the motor. The finger 40 is housed within a notch 41 (FIG. 4) in plate 42 having the form of an arc of a circle centered upon the axis $14_1$. A screw 44 extending cooperating with a threaded hole of the body 33. It is the position of the screw 44 in the light 43 that determines the angular position of the housing 39 with respect to the body 33.

At starting it is not immediately possible to supply circuit 17 with a signal representing the position of the rotor 11 relative to the stator in order to confer upon the stator current the optimal phase allowing the optimal angle between the rotating field and the magnetization of the rotor. In fact, it is necessary to wait until the notch of the coding wheel, intended to produce one impulse per rotation, is in an angular position so that it uncovers the luminous beam of the associated source-detector assembly. This is the reason why a step by step control is generally foreseen upon starting. In order to avoid this step by step control, which presents the drawback of driving the rotor 11 with jerky movements, the first part 25 is caused to turn one rotation. During this rotation, it is necessary to pass through the position for which the impulse is produced, thereby avoiding the step by step order, i.e. the jerky movements.

The possibility of rotation around the axis $14_1$ of the stator member of the device 15 is also useful for overcoming the positioning problems. In fact, since the member 25 does not have an external form of revolution, it can happen that when a reduced space is available for the motor certain angular positions are more favorable than others.

The attachment piece 42 with the light 43 allows adjustment during the first mounting, generally on plant site, of the device 15 of the motor.

I claim:

1. A method of starting an autosynchronous motor wherein the motor includes a stator mounted on a frame, a permanent magnet rotor, a control and power circuit for said stator generating a magnetic field with a direction which is a function of a magnetic field produced by said permanent magnet rotor and controlled by a signal emitted from a position determining device representing angular position of said permanent magnet rotor with respect to said stator, said position determining device comprising:

pulse producing means for emitting one pulse per rotation, said pulse producing means including a rotor member, integral with said permanent magnet rotor and a first member rotatable with respect to said stator, and complementary means, in part integral with said stator frame and in part integral with said first member for defining predetermined relative positioning between said first member and said stator, said method including the steps of:

energizing said motor, and manually rotating said first member to said stator through at least one rotation.

* * * * *